United States Patent [19]

Brockman

[11] Patent Number: 4,853,962
[45] Date of Patent: Aug. 1, 1989

[54] ENCRYPTION SYSTEM

[75] Inventor: Robert T. Brockman, Houston, Tex.

[73] Assignee: Universal Computer Consulting, Inc.

[21] Appl. No.: 129,306

[22] Filed: Dec. 7, 1987

[51] Int. Cl.⁴ .......................... H04L 9/02; H04K 1/00
[52] U.S. Cl. ........................................ 380/44; 380/21;
380/23; 380/25; 380/28; 380/45; 380/47
[58] Field of Search ...................... 380/21, 23, 25, 28,
380/44, 45, 47

[56] References Cited

U.S. PATENT DOCUMENTS

| | | | |
|---|---|---|---|
| 4,605,820 | 8/1986 | Campbell, Jr. | 380/24 |
| 4,607,137 | 8/1986 | Jansen et al. | 380/21 |
| 4,658,093 | 4/1987 | Hellman | 380/45 |
| 4,661,658 | 4/1987 | Matyas | 380/23 |

Primary Examiner—Stephen C. Buczinski
Attorney, Agent, or Firm—Arnold, White & Durkee

[57] ABSTRACT

A method for encrypting signals utilizes the receiver serial number to generate an index number which is used in turn to select an encryption table from among a plurality of such tables. The index number used in conjuction with any given signal is modified for greater security by adding the units digit of the signal length. Further modification of the index number can be made by adding the units digit of the time of transmission. The index number is further modified by adding a shift number by which all data characters are shifted during encryption. In signals based on a defined protocol, the shift number and the units digit of the transmission time are hidden in unused protocol positions within the signal.

10 Claims, 10 Drawing Sheets

FIG. 2

| CHARACTER IN CLEAR TEXT | ENCRYPTED CHARACTER |
|---|---|
| A | M |
| B | I |
| C | Z |
| D | J |
| * * * | * * * |
| Z | T |

ENCRYPTION SYSTEM

BACKGROUND OF THE INVENTION

This invention relates to a system for encrypting and decrypting data signals.

As is appreciated by those of ordinary skill having the benefit of this disclosure, the transmission of encrypted data requires both sender and receiver to have access to information about the encryption method to be incorporated into both the encryption method and the decryption method. An operator receiving a Morse code signal, for example, is able to decrypt the signal because of his a priori knowledge of the meaning of the signal patterns.

Likewise, a signal can be encrypted using a cipher table or encryption table when both sender and receiver have access to a copy of the table. A simple and well-known example is an encryption table such as shown in FIG. 2. In such a table, each letter of the alphabet in the clear-text signal is encrypted by locating it in in the first column of the table and translating it to the corresponding letter in the second column of the table. The letters in the second column comprise the letters of the alphabet distributed at random. In the example shown in FIG. 2, the word "cab" would be translated to "zmi." A greater number of permutations can be obtained for the second column by encrypting each clear-text letter into two-letter sequences, three-letter sequences, and so forth. And of course, nonletter characters such as numbers can also be encrypted along with letters in a similar manner.

It is also well-known to increase the security of an encrypted transmission by utilizing different encryption tables. A familiar example is the one-time pad, in which a series of encryption tables is used, with each encryption table being used once, or on one day, etc., then discarded.

The simple translation method described above is but one method of encryption. Many complex and sophisticated encryption techniques are also known. Many such techniques require considerable work and time, even when performed on a computer, to generate an encrypted signal. Computer encryption using such methods can be very hardware intensive, requiring considerable memory to be used effectively.

In many situations the added security provided by such complex methods is worth the cost in time and resources. In other situations, however, simpler methods that provide some lesser level of security can be more cost-effective.

SUMMARY OF THE INVENTION

In accordance with the present invention, an encryption system and a corresponding decryption system are disclosed. The systems include methods that are used in transmitting signals by a transmitter to a receiver having a known serial or other identifying number.

For each signal, the encryption method uses one of a plurality of encryption tables for encipherment of the signal. Each table is stored at both the transmitter and the receiver. The selection of a particular encryption table is based on an index number that is generated using the receiver's serial number and the length of the signal. Encrypted signals are generated in any of a number of ways known to those of skill in the art, e.g., by a simple character translation in accordance with the encryption table.

In another embodiment, the index number generation process additionally makes use of an arbitrary number which is transmitted to the receiver by encoding it unencrypted into a specified position in the signal.

Another embodiment relates to telecommunications systems in which several receivers are served by a controller which acts as an intermediary between the receivers and the transmitter and which has its own known serial or other identifying number. In this embodiment, the index number generation process makes use of the serial numbers of both the receiver in question and the dispatcher, as well as the signal length and the arbitrary number.

BRIEF DESCRIPTION OF THE DRAWINGS

FIG. 2 depicts a portion of a simple encryption table of the kind usable in accordance with the invention.

Throughout the following detailed description, similar reference numerals refer to similar elements in all Figures of the drawings.

DETAILED DESCRIPTION OF SPECIFIC EMBODIMENTS

An exemplar system is described herein in connection with telecommunications systems utilizing a bisynchronous, polled, multidrop protocol such as the well-known IBM 3270 protocol. It will be understood by those of ordinary skill having the benefit of this disclosure that the system is presented as an illustration of the invention as claimed below and not as a limitation on the claimed subject matter.

Figure 1:
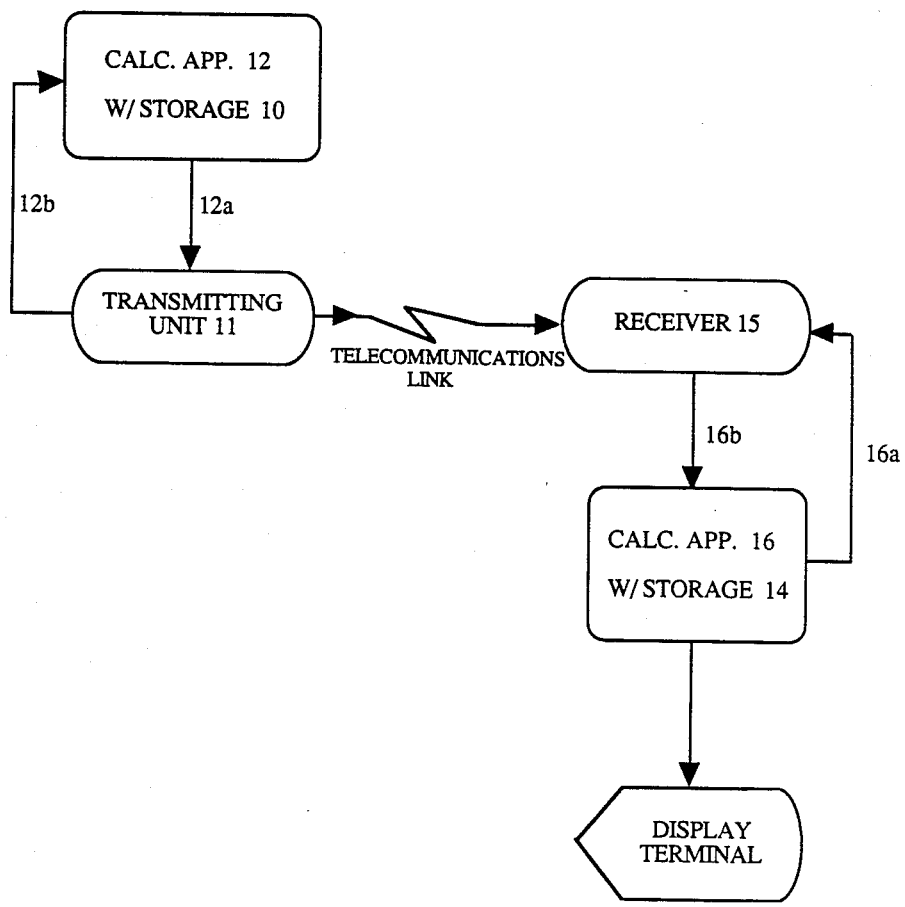
FIG. 1 illustrates a typical telecommunications system of the kind on which the invention can be implemented.

Referring to FIGS. 1 and 2, in the exemplar system, copies of a plurality of encryption tables are stored in a storage unit 10 such as dynamic read-write memory (RAM), a read-only memory (ROM), magnetic or optical disk, or other suitable storage, that is accessible to a transmitting unit 11. The transmitting unit 11 is in turn associated with calculating apparatus 12 such as a programmable central processing unit (CPU), a programmable read-only memory (PROM), or hard-wired discrete logic circuitry. In a typical communications installation, the calculating apparatus 12 often controls the transmitting unit 11, as symbolized by control and monitoring arrows 12a and 12b, as well-known to those of ordinary skill. It will also of course be recognized that the transmitting unit 11 can equivalently be controlled by other well-known means.

In each encryption table in accordance with the invention, data characters (e.g., the letters a-z and A-Z and the decimal numbers 0-9) are each represented respectively by unique encryption characters, which may be generated at random in accordance with well-known methods. FIG. 2 illustrates a portion of a typical simple encryption table. For many purposes, a single encrypted character corresponding to each clear-text character will suffice.

A copy of each encryption table is also stored in a storage unit 14 accessible to a receiver 15 which in turn is associated with calculating apparatus 16 such as a programmable CPU, PROM, or hard-wired discrete logic circuitry. Likewise stored to be accessible to the calculating apparatus 16, e.g., in the storage unit 14 or other suitable storage (or, equivalently, hard-wired in discrete logic circuitry), is a serial or other identifying number associated with the receiver 15. Again, it will be recognized by those of ordinary skill that the calculating apparatus 16 will typically control the receiver 15, as symbolized by control and monitoring arrows 16a and 16b, but that such control can equivalently be had by other well known means.

All receiver serial numbers are also stored in a storage unit accessible to the transmitter calculating apparatus 12 such as the storage unit 10.

Figure 3:
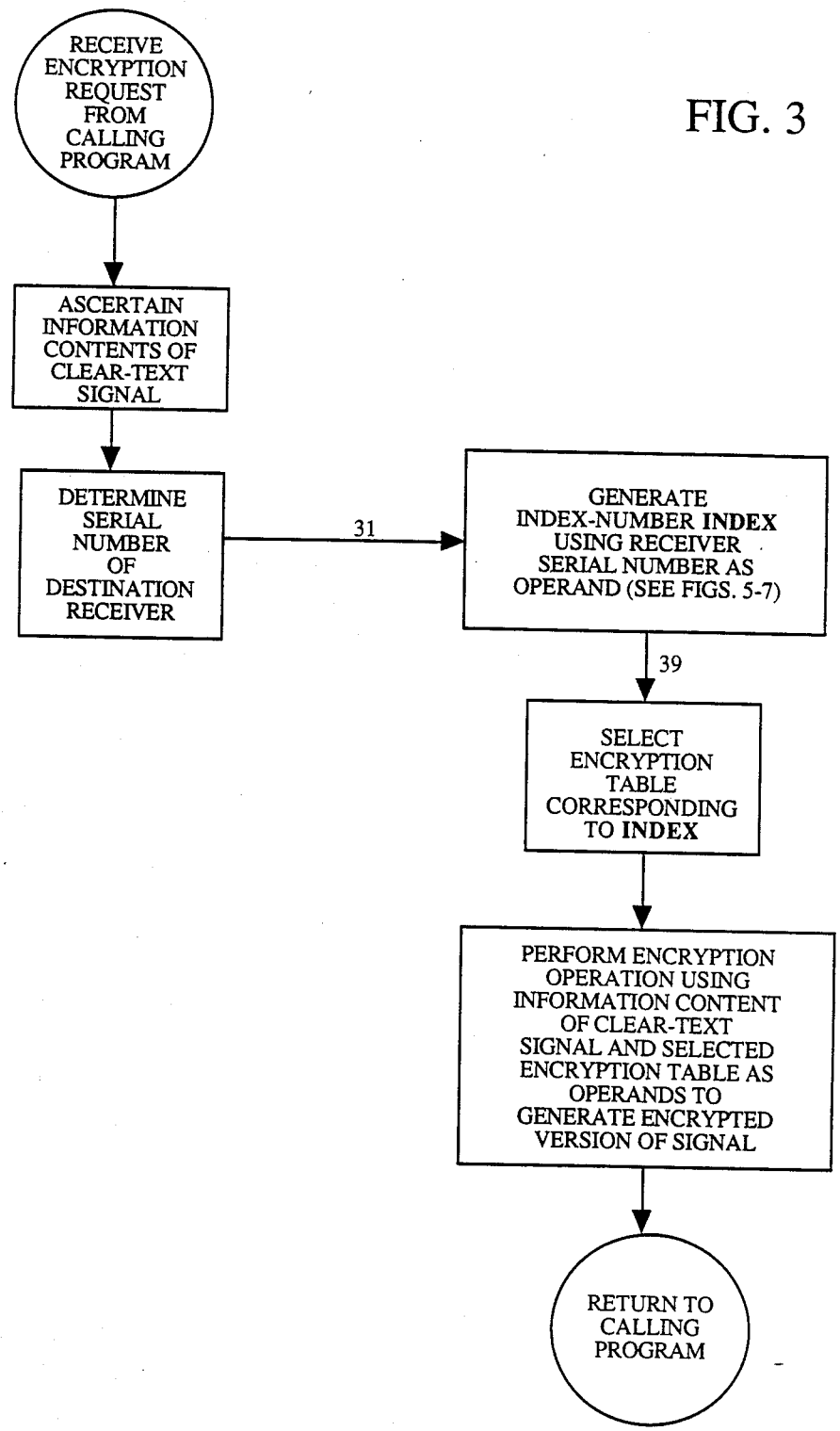
FIGS. 3 and 4 are flow charts of the general methods used to encrypt and decrypt signals, respectively, in accordance with the present invention.
Figure 4:
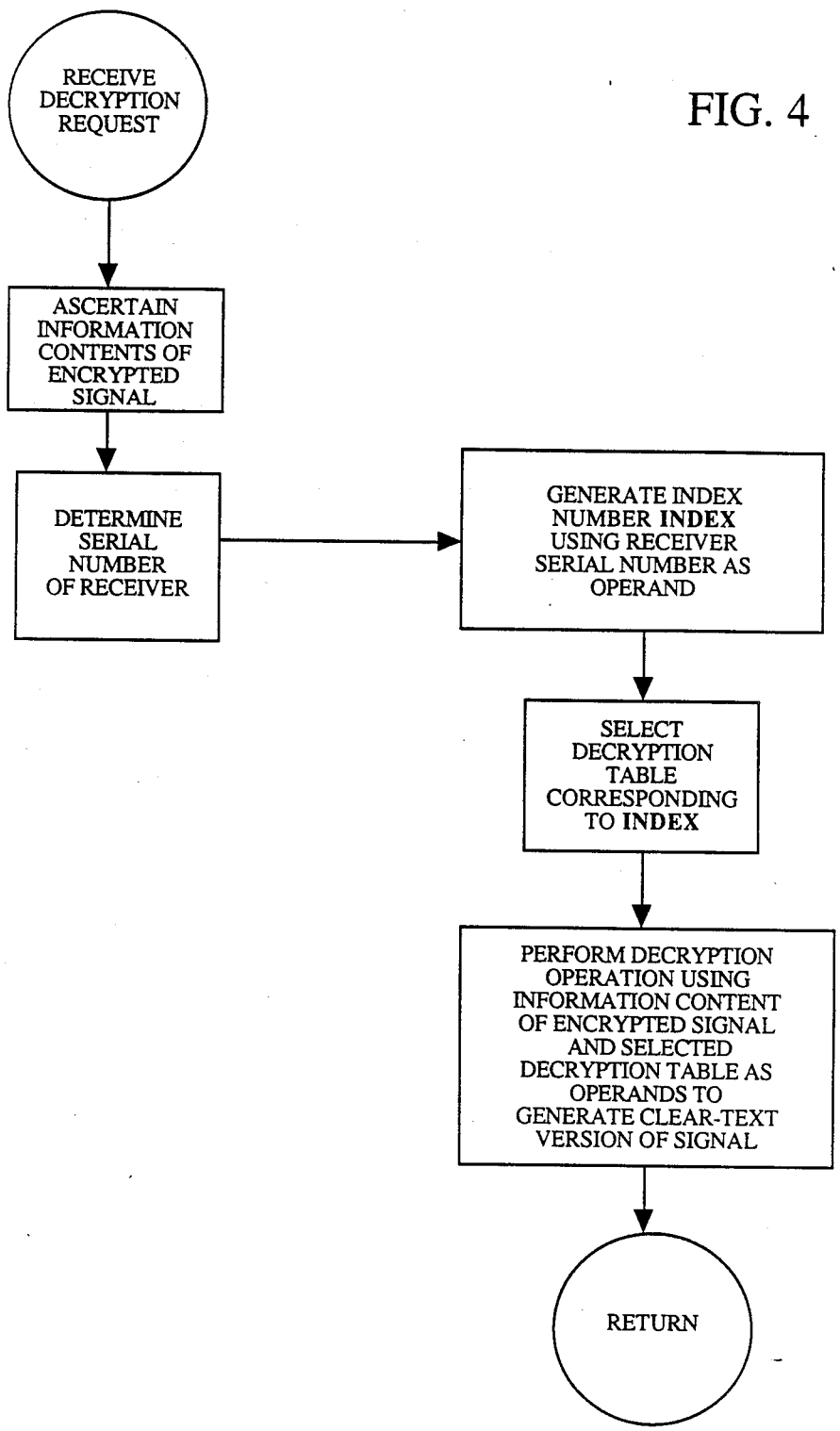

As shown generally in FIG. 3, for each outgoing signal to a particular receiver 15, an index number INDEX is generated by the transmitter calculating apparatus 12. An encryption table uniquely associated with the generated index number is then selected for use. The details of programming the calculating apparatus 12 to access the storage unit 10, to perform the required calculations, and so forth, are well known to those of ordinary skill and will not be further described here.

In a simple embodiment, sixteen encryption tables may be used, numbered 0H-FH. (Numbers with the suffix H are in the "base 16" hexadecimal numbering system, often referred to as the "hex" system, which has 16 digits 0H-9H and AH-FH. By comparison, the traditional decimal system uses a base-10 numbering system having 9 digits 0-9. Numbers with no suffix or the suffix D are in the decimal system.) An encryption table is selected by generating a single- (hex) digit index number, by summing the hex digits of the receiver serial number.

Figure 5:
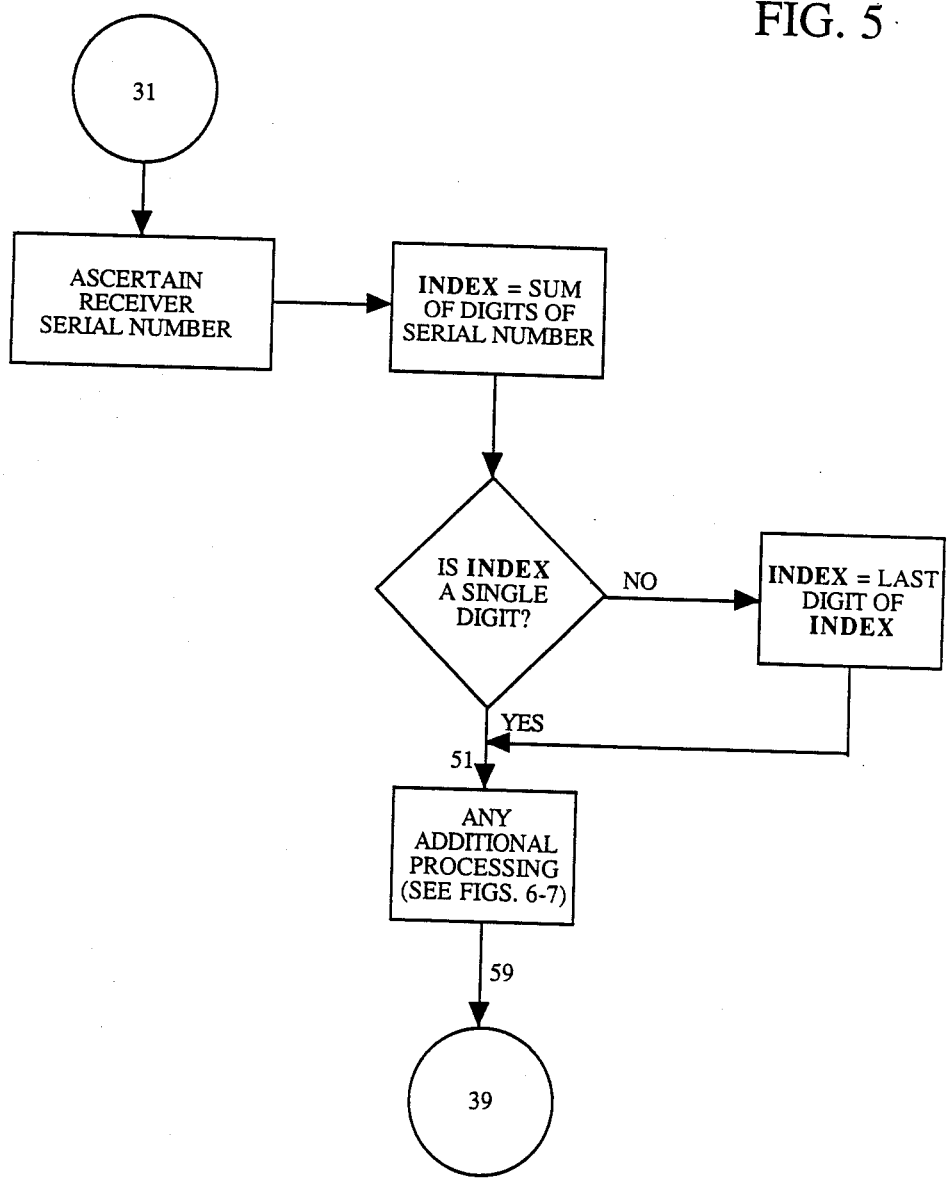
FIG. 5 is a flow chart that depicts, in expanded form, one technique for performing an index-number generation step shown in FIGS. 3 and 4.

One method of generating an index number is depicted in FIG. 5. As an illustrative example, a signal may be transmitted to a hypothetical receiver 15 whose serial number is 123456D. The index number for that receiver would be generated by the transmitter's calculating apparatus 12 by summing the serial number digits to obtain the multi-digit INDEX number 15H (21D).

The digits of INDEX are in turn truncated as shown in FIG. 5 to obtain a number, in this case the single-digit number 5H. Thus, encryption table number 5H would be used by the calculating apparatus 12 for encrypting that signal.

Figure 6:
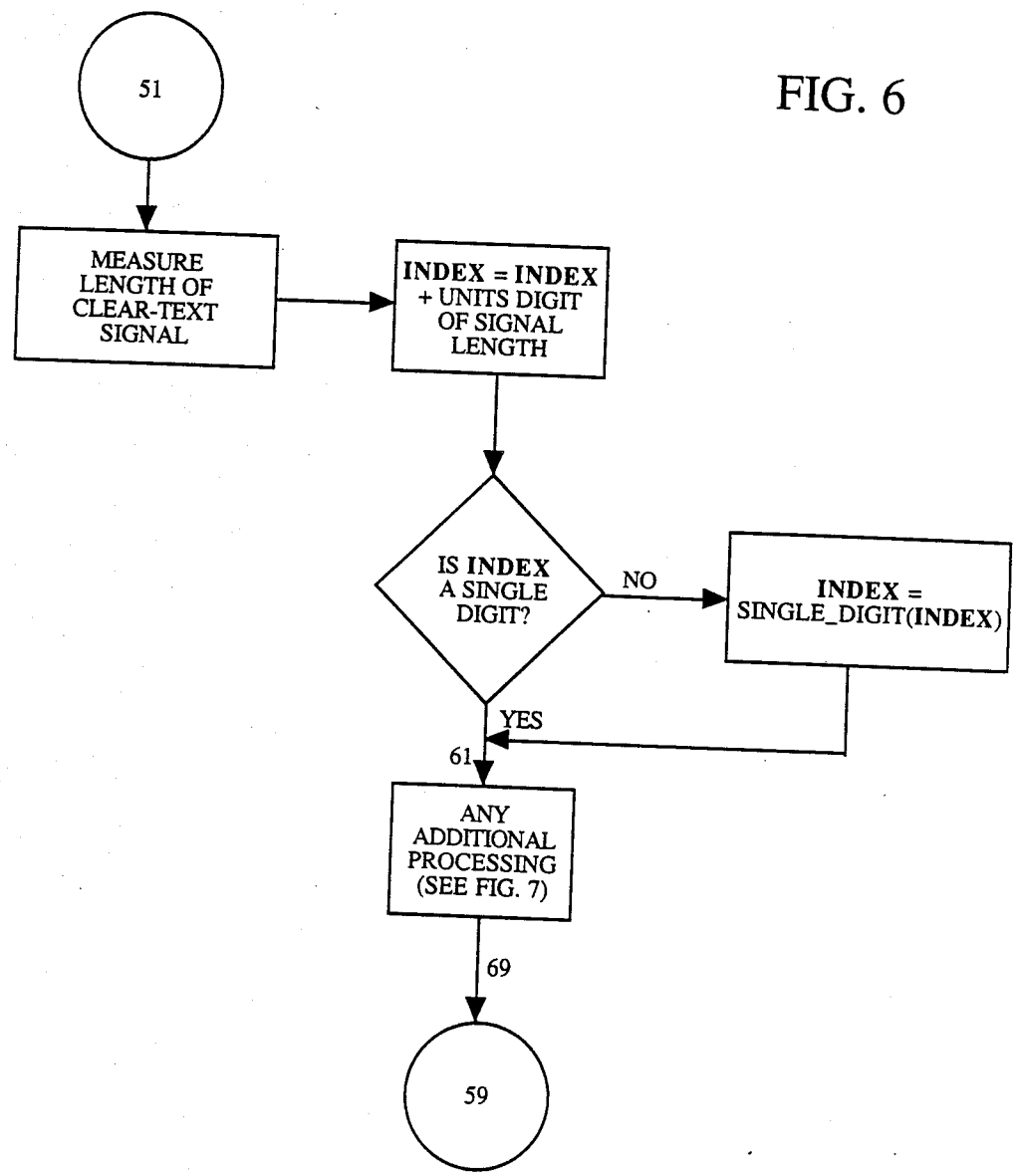
FIGS. 6 and 7 are flow charts of additional steps that can be performed in conjunction with the methods generally depicted in FIGS. 3-5.
Figure 7:
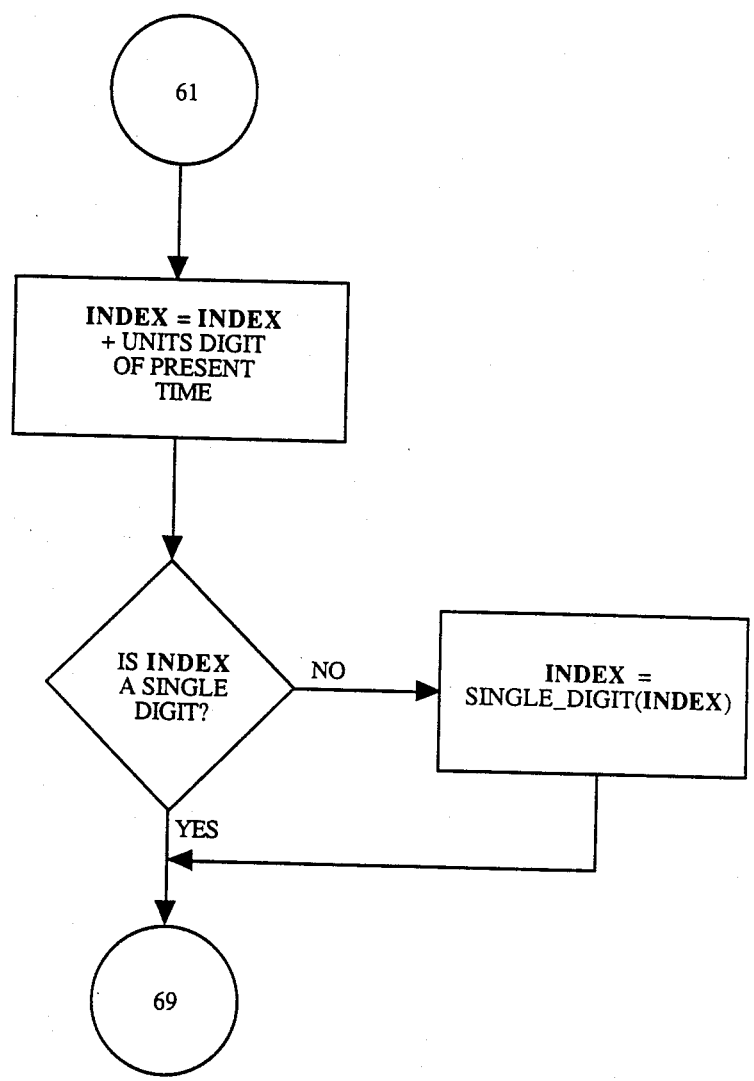

The truncation operation can be replaced by equivalents such as recursive summing of the digits or other specified operation. In FIGS. 6-7, the truncation or other specified operation is represented as "single_digit(INDEX)" using the common function-and-argument notation familiar to those of ordinary skill.

When the receiver 15 receives the signal, its calculating apparatus 16 performs its own similar index number generation process. This yields the index number INDEX that determines which encryption table to use for decrypting the signal.

It will be appreciated by those of ordinary skill having the benefit of this disclosure that the foregoing sum-of-the-digits method for generating an index number INDEX, depicted in FIG. 5, is merely an example and that any desired method can be used to process the receiver serial number. All that is required is that the receiver's calculating apparatus 16 be capable of generating the same index number as the transmitting unit.

In the same vein, referring to FIG. 6, further security is had by complicating the index number generation process, again with data readily available to the calculating apparatus 12 and 16 of both the transmitter 11 and the receiver 15, respectively. For instance, in protocol systems such as the IBM 3270 system, each signal has a definite length that can be measured at both the transmitter 11 and the receiver 15. A number based on this length can be included in the index number generation process.

To illustrate this using the above example, as shown in FIG. 6, the units digit of the signal length can be added to the INDEX variable, and this result truncated (or equivalently, recursively summed, or otherwise processed) to yield a number such as a single-digit INDEX number.

Referring to FIG. 7, still more security is had by factoring in an arbitrary number, e.g, by adding to the INDEX variable a third number such as the units digit of a representation of the present time. The receiver calculating apparatus 16 must be informed of the value of this number, since it is not readily ascertainable or calculatable at the receiver 15. Therefore, this third number is encoded unencrypted in the signal, e.g., at an unused protocol position.

For example, in a 3270 system that does not utilize set-buffer-address commands, the second position of the 3-byte set-buffer-address prefix defined in the 3270 protocol can be used. Those of ordinary skill will appreciate that in the 3270 protocol, the second position of this prefix is always a number from 0 to 9. In this example, therefore, the arbitrary digit used as the third number can be left in single-digit decimal form so that it will appear to be a legitimate protocol symbol.

In such an arrangement, the receiver calculating apparatus 16 is suitably programmed in accordance with well-known techniques to parse the incoming signal and to extract the arbitrary digit from the prespecified location.

Alternative Embodiment

Figure 8:
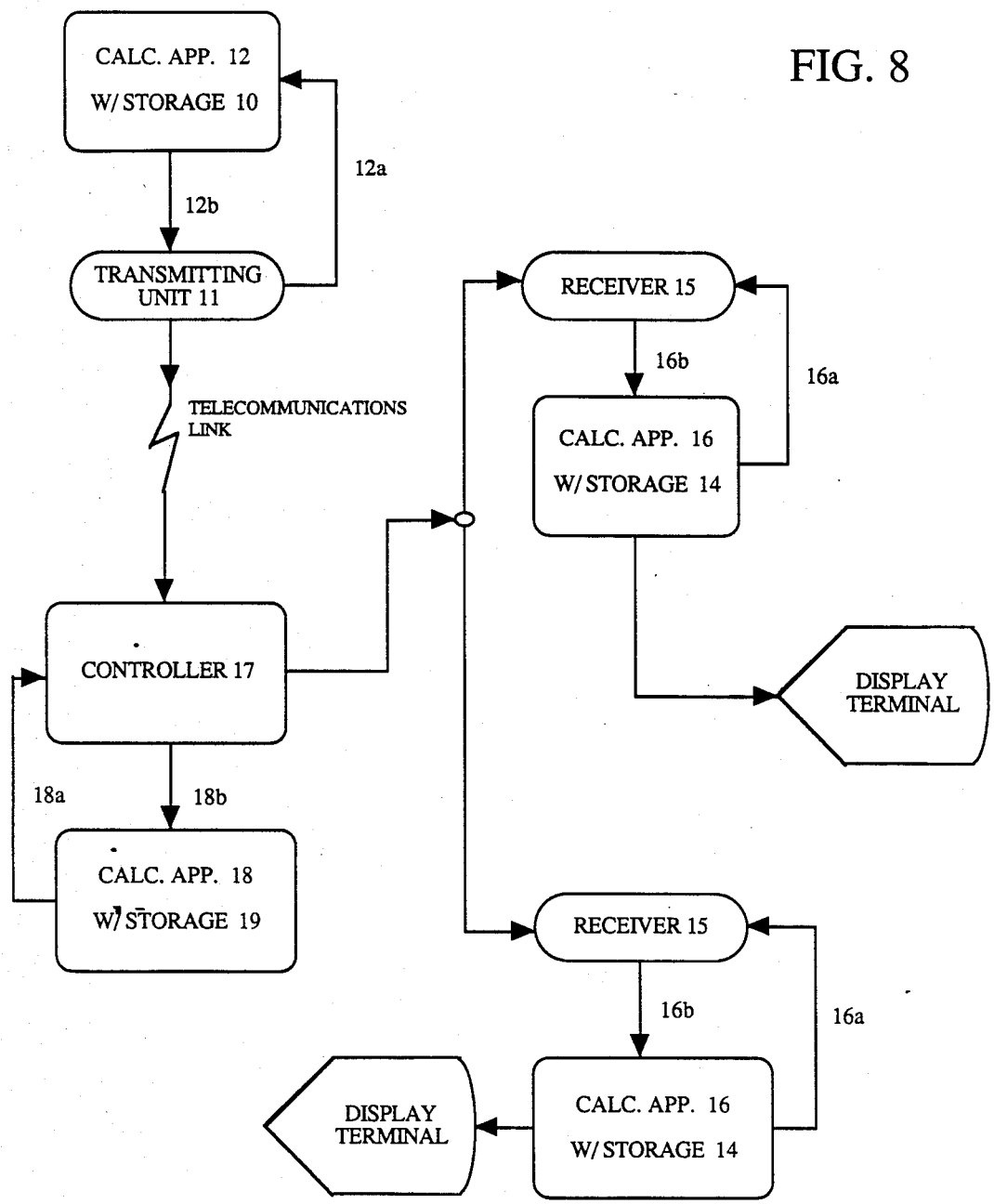
FIG. 8 shows another type of typical telecommunications system on which an alternate embodiment of the invention can be implemented.

An alternative embodiment of the system can be used in telecommunications systems such as is illustrated in FIG. 8, in which a plurality of receivers 15 is serviced by a single controller 17, itself having a serial or other identifying number, which acts as an intermediary between the transmitting unit 11 and the receivers 15. Such a controller generally is controlled by a calculating apparatus 18 which has access to a storage unit 19, as symbolized by arrows 16a and 16b.

In such telecommunications systems, the receivers' calculating apparatus 16 typically do not have ready access to enough memory for convenient storage of the encryption tables, while the controller's calculating apparatus 18 generally does have such access. For such a telecommunications system, an encrypted signal can be generated as described above by using the serial number of the controller 17 instead of the receiver 15 serial number and by programming the controller calculating apparatus 18 to decrypt the signals.

Figure 9:
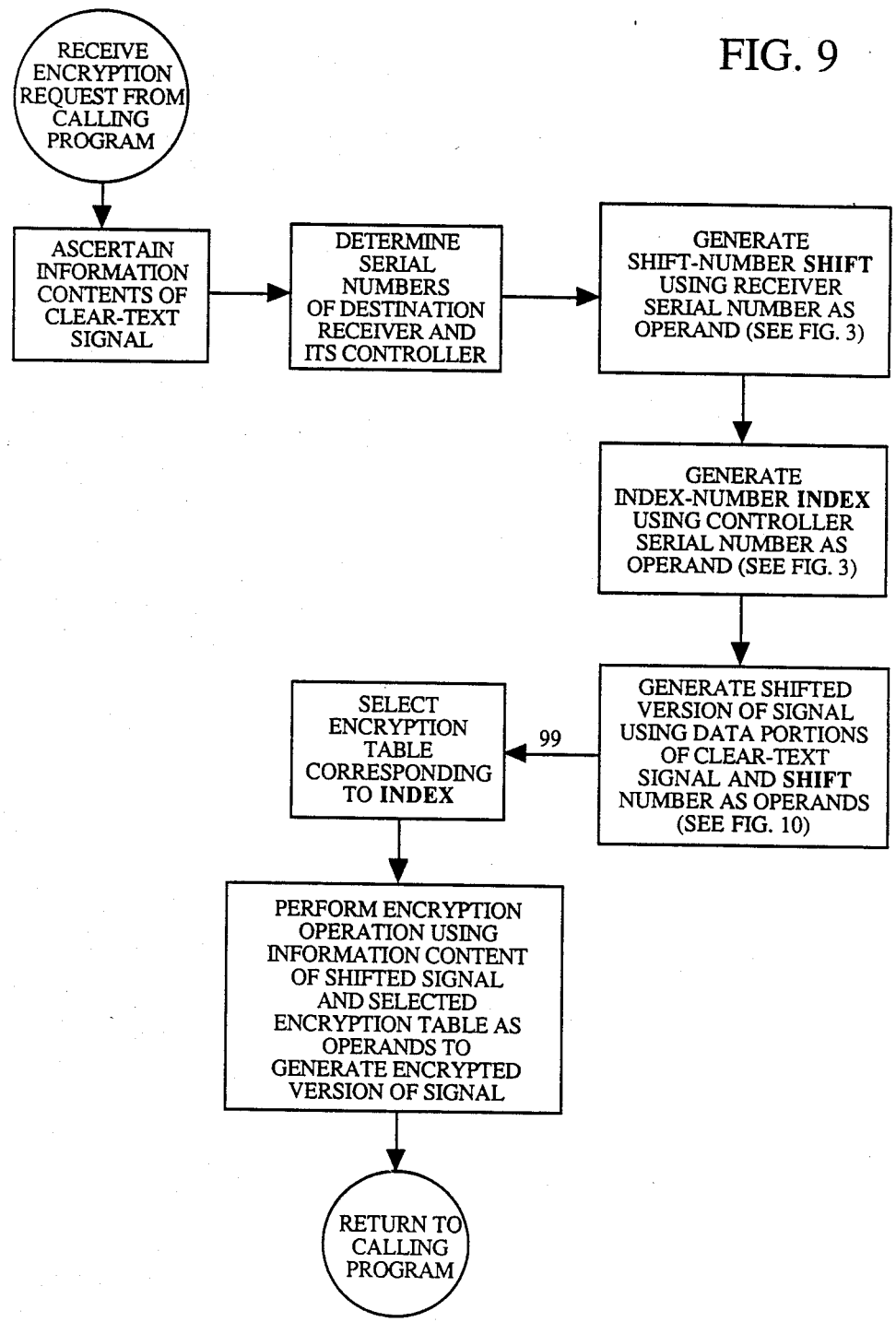
FIG. 9 is a flow chart of a general method in accordance with the alternate embodiment.
Figure 10:
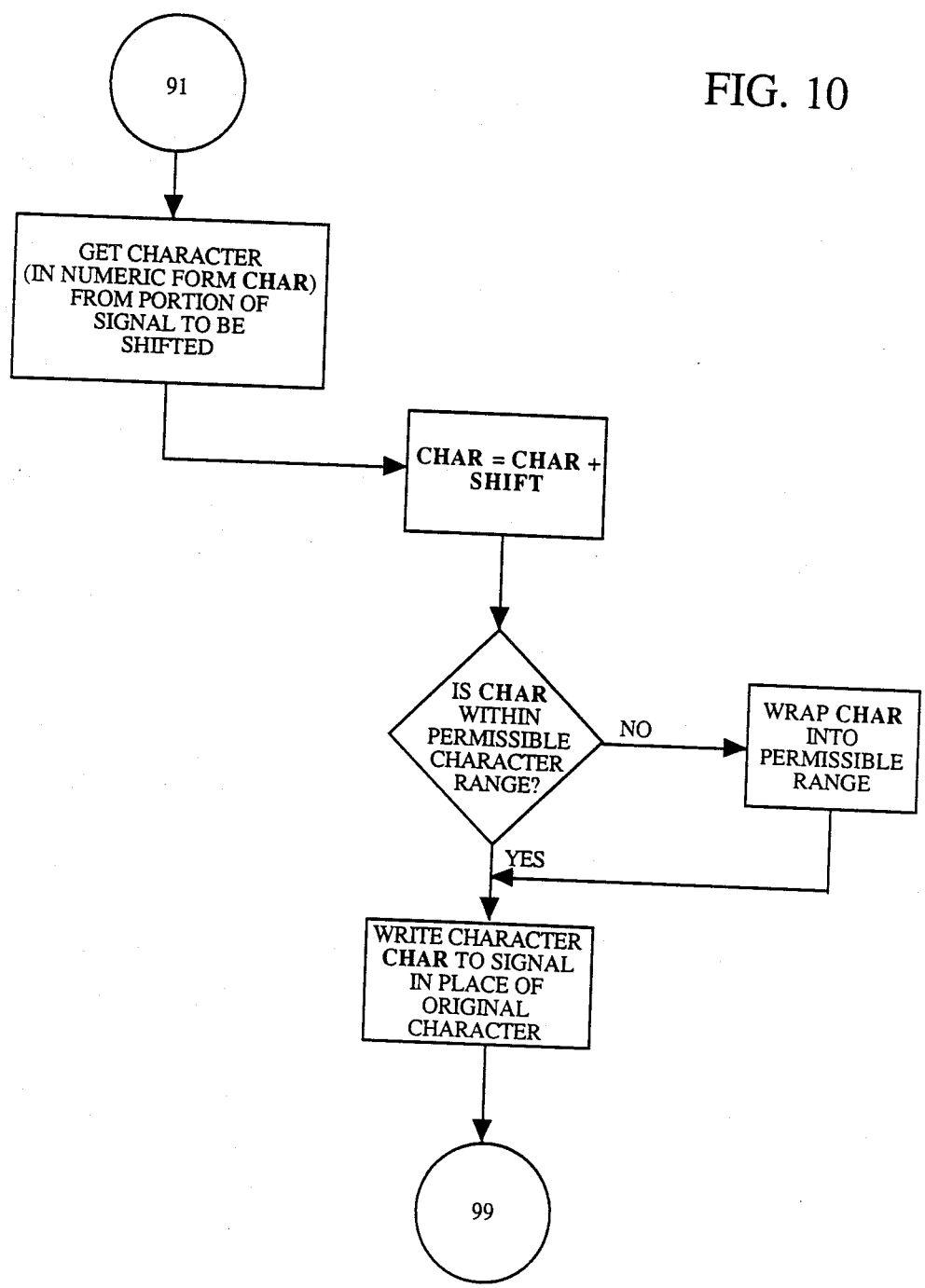
FIG. 10 is a flow chart showing one step in the method in expanded form.

Receiver calculating apparatus 15 in such systems usually do have some programming capability and "scratchpad" memory such as storage 14. For such systems, additional security can be had during the encryption process by generating a shift number SHIFT using the particular receiver 15 serial number for which the signal is destined (by summing its digits or otherwise as described above), then adding the shift number SHIFT, prior to encryption, to selected characters in the signal. This method is generally illustrated in FIGS. 9 and 10.

For example, in the 3270 protocol, each character in the range 20H–7FH can be shifted by adding a single hex digit 01H–0FH, generated from the receiver serial number; any shift past the 7FH boundary can be wrapped around to 20H to avoid including control characters in the encrypted signal.

Alternatively, the shift number SHIFT can be arbitrary and can be stored unencrypted in the signal at an unused protocol position, as described above, e.g., in the third character of the prefix of a 3270 protocol message.

If desired, the SHIFT number can be incorporated in the INDEX number in the manner described above. This adds still another layer of complexity to the encryption process, with relatively little cost in time and resources.

In such an embodiment, the controller calculating apparatus 18 is programmed as described above to decrypt the "shifted" signal and pass it on, still shifted, to the selected receiver 15. The programming of the receiver calculating apparatus 16 causes it to generate the shift number SHIFT as described above and then to "unshift" the decrypted signal using the reverse of the technique shown in FIG. 10, i.e., by subtracting the SHIFT number from each character in the shifted portion of the signal and wrapping to the top of the permissible range as necessary.

It will be appreciated by those skilled in the art having the benefit of this disclosure that this invention is believed to be capable of application in other situations. Accordingly, this description is to be construed as illustrative only and as for the purpose of teaching those skilled in the art the manner of carrying out the invention.

It is also to be understood that the form of the invention shown and described is to be taken as the presently preferred embodiment. Various modifications and changes may be made without departing from the spirit and scope of the invention as set forth below in the claims. It is intended that the following claims be interpreted to embrace all such modifications and changes.

What is claimed is:

1. A method for encrypting a signal for transmission to a receiver,
    said signal having a known length representable by a length number comprising one or more digits,
    said receiver having a known identifying number comprising one or more digits,
    the method comprising the steps of:
    generating a hash number by performing a specified hashing operation using the identifying number as an operand;
    generating a single-digit index number by adding the units digit of the signal length number to the hash number and performing a specified generation operation; and
    encrypting the signal in accordance with an encryption table corresponding to said index number.

2. A method for encrypting a signal for transmission to a receiver, said receiver having a known identifying number comprising one or more digits, said method comprising the steps of:
    generating a hash number by performing a specified hashing operation using the identifying number as an operand;
    encoding an arbitrary number at a specified position in the signal outside the specified portion;
    generating a single-digit index number by adding the arbitrary number to the hash number and performing a specified generation operation; and
    encrypting the signal in accordance with an encryption table corresponding to said arbitrary number.

3. A method for encrypting a signal for transmission to a receiver
    said signal having a known length representable by a length number comprising one or more digits,
    said receiver having a known identifying number comprising one or more digits,
    the method comprising the steps of:
    generating a hash number by performing a specified hashing operation using the identifying number as an operand;
    generating a single-digit index number by adding the units digit of the signal length number to the hash number and performing a specified generation operation; and
    encrypting the signal in accordance with an encryption table corresponding to said index number.

4. A method for encrypting a specified portion of a signal for transmission to a receiver,
    said specified portion having a known length representable by a length number comprising one or more digits,
    said receiver having a known identifying number comprising one or more digits,
    the method comprising the steps of:
    performing a summing-of-the-digits operation on said identifying number to generate a single-digit hash number;
    encoding an arbitrary single-digit number at a specified position in the signal outside the specified portion;
    obtaining an index number by adding to the hash number (a) the units digit of the signal length number and (b) the arbitrary single-digit number, and if the result is greater than the base of the numbering system in which the index number is expressed, subtracting said base; and
    encrypting the signal in accordance with an encryption table corresponding to said index number.

5. A method for encrypting a specified portion of a signal for transmission to a controller for retransmission to a receiver,
    said specified portion having a known length representable by a signal length number,
    said controller and said receiver each having a known identifying number comprising one or more digits,
    the method comprising the steps of: performing a specified hashing operation on the controller identifying number to generate a controller hash number;
    encoding an arbitrary number at a specified position in the signal outside the specified portion;

generating an index number by adding to the controller hash number (a) said signal length number and (b) the arbitrary number;

performing a specified hashing operation on the receiver identifying number to generate a shift number;

adding the shift number to selected numeric representations of data symbols within the signal; and generating an encrypted signal in accordance with an encryption table corresponding to said index number.

6. A method for encrypting a specified portion of a signal for transmission to a controller for retransmission to a receiver, said specified portion having a known length representable by a length number comprising one or more digits, said controller and said receiver each having a known identifying number comprising one or more digits, the method comprising the steps of:

performing a summing-of-the-digits operation on the receiver identifying number to generate a single-digit shift number;

generating a shifted signal by adding the shift number to selected numeric representations of data symbols within the signal;

performing a summing-of-the-digits operation on the controller identifying number to generate a single-digit controller sum number;

encoding the units digit of a representation of the present time at a specified position in the signal outside the specified portion;

obtaining a single-digit index number by adding to the controller sum number (a) the units digit of the signal length number and (b) the arbitrary single digit number and, if the result is greater than the base of the numbering system in which the result is expressed, subtracting said base;

generating an encrypted signal based on the shifted signal using an encryption table corresponding to said index number.

7. A method for using a plurality of numbered encryption tables to encrypt a signal for transmission to a receiver, said receiver having a known identifying number, said signal having a known length, the method comprising the steps of:

generating an index number by performing one or more specified generation operations using the identifying number and the signal length as operands; and encrypting the signal in accordance with an encryption table corresponding to said index number.

8. A method for using a plurality of numbered encryption tables to encrypt a specified portion of a signal for transmission to a receiver, said receiver having a known identifying number, said signal having a known length, the method comprising the steps of:

encoding an arbitrary number into the signal at a position outside the specified portion;

generating an index number by performing one or more specified generation operations using the identifying number, the arbitrary number, and the signal length as operands; and encrypting the signal in accordance with the encryption table corresponding to said index number.

9. A method for using a plurality of numbered encryption tables to encrypt a specified portion of a signal for transmission to a controller for retransmission to a terminal, said control and said terminal each having a known identifying number, said signal having a known length, the method comprising the steps of:

encoding an arbitrary number into the signal at a position outside the specified portion;

generating an index number by performing one or more specified generation operations using the controller identifying number, the terminal identifying number, the arbitrary number, and the signal length as operands; and encrypting the signal in accordance with the encryption table corresponding to said index number.

10. An information storage device tangibly embodying a program comprising instructions adaptable for execution on a programmed machine, wherein the method of any one of claims 1–9 is performable through the execution of said instructions by the machine.

* * * * *